March 28, 1950     C. W. HANSELL     2,502,005
APPARATUS FOR MANUFACTURING TAPERED WIRES
AND TAPERED STRIP MATERIAL
Filed April 10, 1948
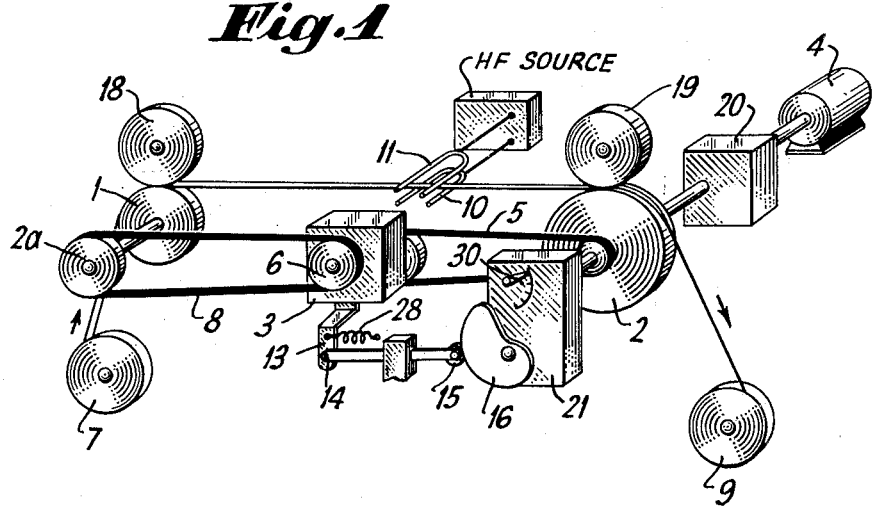
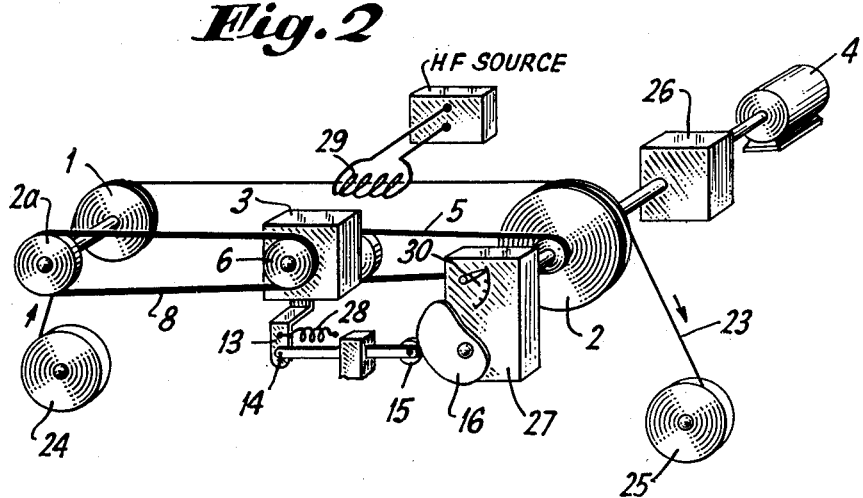
INVENTOR
CLARENCE W. HANSELL
BY
ATTORNEY Patented Mar. 28, 1950

2,502,005

UNITED STATES PATENT OFFICE 2,502,005

APPARATUS FOR MANUFACTURING TAPERED WIRES AND TAPERED STRIP MATERIAL

Clarence W. Hansell, Port Jefferson, N. Y., assignor to Radio Corporation of America, a corporation of Delaware Application April 10, 1948, Serial No. 20,298

12 Claims. (Cl. 219—1)

This invention relates to new and useful apparatus and means for manufacturing longitudinally tapered stock for any given taper and length.

An object of this invention is to provide an improved device which will taper wire or strip material efficiently and uniformly.

Another object of this invention is to provide a novel means for manufacturing wire or strip material so as to produce a taper longitudinally without the use of precision dies. There is a long felt need for the manufacture of wire or strip material with taper of constant slope or degree (constant change of diameter or width or thickness throughout a predetermined length) for electrical apparatus; and this invention meets the requirements of this manufacturing need.

This invention is particularly adaptable for forming the resistance wire for volume controls, potentiometers, etc., in which tapered resistance values are desired. It is also of value in making electrical heater wires for use in places where it is desirable to control the amount of heat released per unit length of wire or strip. Value is also found in making tapered lamp and vacuum tube filaments in order to obtain a more desirable distribution of temperature or rate of evaporation during life.

The apparatus and method of this invention are not limited to the working of metals but are also applicable to thermoplastic materials of all kinds, and even to materials which are softened by transient exposure to softening liquids and vapors. In general the process is one which can controllably reduce the size and usually increase the strength of the stretched materials without the use of dies.

This invention is a further improvement on my copending application Serial No. 508,626, filed November 1, 1943, now Patent No. 2,479,353 dated August 16, 1949. The copending application is for an invention which uniformly reduces the cross-section of wire or strip (but does not taper its longitudinal cross-section) by passing the wire or strip between two rollers which are mechanically coupled together and subjected to a torque tending to make the rollers turn and stretch the wire or strip by driving the rollers at different peripheral speeds.

This invention produces longitudinally tapered sections where-in the area of cross-sections vary with length in a desired manner by providing an automatically variable coupling ratio device; and radio frequency heating means interposed between the forward and backward pulling rollers of my copending application Serial No. 508,626.

A feature of the present invention is the novel arrangement of a high frequency induction heating device and two interlinked or mechanically coupled rollers which may be of the same or different diameters, the movement of one of the rollers being variable in speed, which speed is governed by an automatically variable coupling device controlled by a cam secured on a shaft, through a gear train or other variable ratio device, to the other roller. This high frequency induction heating device is not shown or described in detail in this disclosure because this feature is fully described and claimed in my copending application Serial No. 401,771, now Patent No. 2,364,526, dated December 5, 1944.

The variable movement of the coupling device will then continuously and automatically taper and stretch the material a predetermined amount.

An advantage of the present invention is that it permits adjustment of the longitudinal dimensions of strip material which at present cannot always be handled satisfactorily by rolling or drawing because of the differences in the hardness and viscosity of the materials.

The principle of this invention is applicable to all sorts of materials including metals, plastics, etc., which materials were previously produced by rolling or drawing operations.

A better understanding of this invention will be had by referring to the accompanying drawings, in which:

Fig. 1 is a perspective view of the invention as applied to tapering the cross sectional area of thin sheet material; and Fig. 2 is a perspective view of a device of the invention, for tapering the diameter and cross sectional area of wires with the length of said wires.

Referring now to Fig. 1 of the drawing, the rollers 1 and 2 are supported from a common base (not shown). Sheet or strip material from a reel 7 is passed over the rollers 1 and 2. The rollers are coupled together (for rotation at different peripheral speeds) by means of a variable coupling device 3. The input shaft end of the coupling device 3 is driven by a motor 4 through the medium of a speed reduction gear train 20 and a link belt or chain 5. The output shaft end of the variable speed transmission device 3 has a wheel 6 which drives the roller 2 at a greater rate of peripheral speed than that of roller 1, through the medium of a link belt or chain 8. The arrangement of the variable coupling between the two rollers is such as to provide a desired degree of taper along the strip before it passes over roller 2, where it is then wound upon the finished stock roller, 9. To assist and control the stretch of the material, to form the taper, as the material moves from one roller to the other, a means of heating the material between the rollers is provided. This may, as an example be a high frequency power type of heating in which case the power is applied to electrodes 10 and 11 from a high frequency source. This high frequency power will raise the temperature of a portion of the strip material to or beyond the softening temperature. As soon as proper temperature is reached between the rollers 1 and 2, which before could move in response to the torque only, by stretching, the material, will begin to move as the heated material softens and stretches. The rate of motion or stretching and forming of the taper is automatically controlled by the rate of heating. The adjustment of the rate of taper (whether variable or constant) between the input and output of the variable transmission device is determined by a lever 13 which is pivoted at 14 and actuated by a cam follower 15 and the position of the cam follower is determined by the restraining spring 28 and by the rotation of cam 16 or by a suitable cam 16 alone to control all motions of lever 13. Cam 16 is actuated by motor 4 through variable ratio transmission device 21 and speed reduction gear train 20. The length of the taper is dependent upon the ratio setting of the variable ratio transmission device 21 and this setting may be indicated by a dial and pointer 30. The geometric shape of the curved face of cam 16 will determine the type of taper produced by the device of this invention. Preventage of any slippage of the strip material as it passes over rollers 1 and 2 is maintained by idler rollers 18 and 19.

In the operation of the device of this invention, the rollers 1 and 2, as coupled together by the interposed variable speed device, previously called a variable transmission device, are subjected to a more or less constant torque which tries to stretch the material. If the torque is great enough, the material may be stretched when the material is cold but for the present example it is assumed that the torque is so adjusted that there is no rotation of the rollers and no stretching if the material is cold. A portion of the material, at a point between rollers 1 and 2, is now subjected to heating by any suitable means, in this example, by high frequency induction. The high frequency power is applied to electrodes such as 10 and 11 from source 12. This high frequency power will raise the temperature of a portion of the material to or beyond the softening temperature. As soon as the proper temperature is reached, the rollers 1 and 2, which previously could not move, will begin to move as the heated material softens and stretches. The rate of motion of tapering is automatically controlled by the variable speed device 3 and results in uniform stretching and tapering of the material. While the stock has a longitudinal taper, it should be understood that the cross sectional width and thickness is also reduced in a manner similar to the stretching of an ordinary rubber band.

Referring now to Fig. 2 of the drawings, the apparatus shown is somewhat similar to that shown in connection with the tapering of the strip material in Fig. 1, except that it stretches the wire so as to produce a longitudinal taper. In the operation of this device, a wire 23 of any standard stock diameter is wound upon spool 24 and is drawn over the drums 1 and 2 which are somewhat concave on their outer cylindrical surface (in the concaved manner usually applied to drawing or stretching operations; that is, three or four turns of wire are applied around each drum). The drums 1 and 2 are coupled together for different relative speeds by means of a variable speed transmission device 3, and are driven by means of the link belts or chains 5 and 8 driving drums 1 and 2 in a manner similar to that mentioned above in connection with Fig. 1. High frequency induction or other suitable form of heating is applied to a point 29 along the wire between the drums; and the rate of motion and stretch of the wire is automatically controlled by the rate of heating. The finished tapered wire is wound upon the spool 25.

An advantage of the system of this invention over that of the prior art is that the taper and thickness of the finished wire is automatically held to the same percentage of tolerance as would be present in the original stock material, and the necessity for extremely close calculations and control of the thickness and precision of fine dies, as now required, is avoided. The taper of the wire (irrespective of the geometric description) is controlled in a manner similar to that mentioned above in connection with Fig. 1, by having lever 13 pivoted at 14 and actuated by cam follower 15. The rate of rotation of cam 16 driven by motor 4 through the speed reduction gear train 26 and variable ratio transmission device 27 determines the length of tapered wire and the geometric shape of cam 16 determines the type of taper and the amount or degree of taper. The outline and shape of cam 16 can be changed to suit any requirement of variation of tapers or variability of tapers. For relatively short tapered wires or strips the ratio of turns for the rolls may be kept fixed, but one or both of the rolls may have spiral grooves of tapered width which will provide the desired taper automatically. In some special cases, simply winding the wire in a deep narrow groove would cause the diameter to change as the wire is wound on and off to give a desired taper.

What is claimed is:

1. Apparatus for producing longitudinal tapered stock comprising a pair of rotatable devices upon which said stock is moved, means intermediate said rotatable devices to heat said stock, and means coupled to said rotatable devices to apply a force to variably stretch and to longitudinally taper said stock as it passes from one rotatable device to the other.

2. Apparatus for producing longitudinally tapered stock comprising a pair of rotatable devices upon which said stock is moved, means to apply a force tending to stretch said stock including a variable speed device coupled between said rotatable devices to longitudinally taper said stock as it passes from one rotatable device to the other.

3. Apparatus for producing longitudinally tapered wire comprising a pair of rotatable devices upon which said wire is moved, means intermediate said rotatable devices to heat said wire longitudinally and means to apply a force to stretch and taper said wire as it passes said first means between said rotatable devices.

4. A device for producing longitudinally tapered stock comprising a pair of rotatable devices upon which said stock is moved, means including a high frequency source for heating said stock as it passes between said rotatable devices, and stretching means including a variable speed device coupled between said rotatable devices to longitudinally taper said stock by stretching the heated stock.

5. A device for controlling the taper of materials comprising a variable coupling device, two feed rollers located on opposite sides of and linked to said variable coupling device for gripping, stretching, and moving said material; and cam means attached to a shaft of one of said feed rollers to change the speed of said variable coupling device to form a longitudinal taper in said material as it passes between said feed rollers.

6. A device according to claim 5, comprising in addition means to apply a force tending to stretch said material, and means arranged to heat said material between two gripping members sufficiently to permit said material to stretch as its taper is being formed.

7. A device for producing longitudinally tapered stock comprising a motor having an extended shaft, a roller on said extended shaft for rotation therewith, a cam secured to one end of said shaft for rotation therewith, a second roller, a variable speed device arranged for the rotation of said second roller at a different rate of speed than said first mentioned roller, means including a high frequency source for heating said stock as it passes over said rollers, and means including a lever coupled between said cam and said variable speed device to stretch and to longitudinally taper said stock.

8. An automatic device for controlling the longitudinal taper of wire comprising a variable coupling device, two feed rollers located on opposite sides of and linked to said variable coupling device for gripping and moving said wire, and cam means coupled to one of said feed rollers to change the speed of said variable coupling device to continually vary the speed of another one of said rollers to form a longitudinal taper in said wire as it passes between said feed rollers.

9. A device according to claim 8, comprising in addition means to apply a force tending to stretch said wire, and radio frequency means arranged to heat said wire between two gripping members sufficiently to permit said wire to stretch as its taper is being formed.

10. A device according to claim 7, comprising in addition, a variable speed device for the rotation of the cam at any predetermined speed.

11. A device according to claim 7, comprising in addition, a speed changing device between the motor and the first roller for the rotation of said first roller at any desired peripheral speed.

12. A device for producing longitudinally tapered stock which comprises a pair of spaced rotatable devices upon which said stock is moved, means coupled to said devices for rotating the same at different speeds, and means intermediate said devices for heating said stock as it passes from one rotatable device to the other.

CLARENCE W. HANSELL.

REFERENCES CITED

The following references are of record in the file of this patent:

UNITED STATES PATENTS

| Number | Name | Date |
| --- | --- | --- |
| 342,040 | Reese | May 18, 1886 |
| 1,013,016 | Horton | Dec. 26, 1911 |
| 1,422,085 | Davies et al. | July 11, 1922 |
| 1,907,907 | Varney | May 9, 1933 |
| 2,140,728 | Zarafu | Dec. 20, 1938 |
| 2,187,785 | Hoyt | Jan. 23, 1940 |
| 2,332,803 | Lorig | Oct. 26, 1943 |
| 2,422,636 | Taylor | June 17, 1947 |